US006285656B1

(12) United States Patent
Chaganty et al.

(10) Patent No.: US 6,285,656 B1
(45) Date of Patent: Sep. 4, 2001

(54) ACTIVE-PASSIVE FLOW SWITCH FAILOVER TECHNOLOGY

(75) Inventors: Srinivas Chaganty; Vijai Jaswa, both of San Jose; Akbal Karlcut, Santa Clara, all of CA (US)

(73) Assignee: HolonTech Corporation, San Jose, CA (US)

( * ) Notice: Subject to any disclaimer, the term of this patent is extended or adjusted under 35 U.S.C. 154(b) by 0 days.

(21) Appl. No.: 09/374,395

(22) Filed: Aug. 13, 1999

(51) Int. Cl.[7] .................................................. G01R 31/08
(52) U.S. Cl. ............................................ 370/228; 370/217
(58) Field of Search .................................... 370/225–228, 370/216–220, 242–6; 709/223–226; 340/827, 825.01, 825.02, 825.06, 825.16

(56) References Cited

U.S. PATENT DOCUMENTS

| | | | |
|---|---|---|---|
| 4,964,120 | * | 10/1990 | Mostashari ........................ 370/228 |
| 5,388,243 | * | 2/1995 | Glider et al. ...................... 395/425 |
| 5,745,795 | * | 4/1998 | Pecone et al. ..................... 710/62 |
| 5,812,819 | | 9/1998 | Rodwin et al. .................... 395/500 |
| 5,867,640 | * | 2/1999 | Aguilar et al. .................... 714/6 |
| 5,936,936 | | 8/1999 | Alexander, Jr. et al. ........... 370/216 |
| 6,088,330 | * | 7/2000 | Bruck et al. ...................... 370/228 |

\* cited by examiner

*Primary Examiner*—David R. Vincent
(74) *Attorney, Agent, or Firm*—Skjerven Morrill MacPherson LLP; Fabio E. Marion

(57) ABSTRACT

A network flow switch system that uses an active flow switch and a passive flow switch in conjunction to achieve redundancy or failover. The flow switches switch information between network components via Y-cables that allow both flow switches to remain simultaneously connected to the network devices. A failover link connects the flow switches together and allows the passive flow switch to monitor the status of the active flow switch. The active flow switch performs all switching while the active flow switch is operational.

32 Claims, 7 Drawing Sheets

ACTIVE-PASSIVE FLOW SWITCH FAILOVER TECHNOLOGY

BACKGROUND OF THE INVENTION

1. Field of the Invention

This invention relates generally to computer networks and specifically to failover or redundancy in network switches or routers.

2. Related Art

It is often desirable for network equipment, such as that equipment used for switching or routing of information packets between network devices, to remain in operational condition for continuous periods of time. Failure of network equipment can be inconvenient and costly. Active-passive operation is sometimes used to minimize the effects of equipment failure. In active-passive operation, sometimes referred to as failover or redundancy, two components have overlapping capabilities. An active component performs a particular task, but in the event that the active component fails, the passive component takes over performance of the task.

One application of active-passive operation is in networking equipment. More specifically, two switches may be dedicated to route packets between network devices. One switch is configured to be active and one switch is configured to be passive. Prior art techniques for providing active-passive operation require physically switching the signal wires that are connected to the active unit and passive units. This scheme, however, presents several drawbacks. First, each network port requires a minimum of 4 signal wires to be switched from the active unit to the passive unit. Hence a large number of circuits need to be physically switched. Second, the switching requires the use of electromechanical relays since the signal levels are very low (in the tens to hundreds of millivolts range) and very high frequency (hundreds of megahertz). Third, electromechanical relays are bulky, costly, prone to high failure rates, and not as reliable as passive devices or silicon integrated circuits. Fourth, the control signal that switches the relay from one unit to another introduces a single point of failure, namely in the event of a failure in the control signal, the entire active-passive combination may become inoperative, even if the active and passive units themselves remain operational. Finally, the relays require a power source, which introduces yet another possible point of failure in the configuration.

There is thus need for a network flow switching system that utilizes an active-passive configuration to provide redundancy without relying on electromechanical relays.

SUMMARY OF THE INVENTION

A network flow switching system according to the present invention comprises two flow switches, the first being active and the second being passive. A plurality of Y-cables are used in place of electromechanical relays. Each Y-cable is connected to the first switch, the second switch, and one of the servers or routers in the network. The first flow switch and the second flow switch route packets between the plurality of servers and the plurality of routers through the Y-cables. While the first flow switch is operational, the first flow switch maintains its active status and performs all of the routing and the second flow switch maintains its passive status. If the first flow switch becomes non-operational, the second flow switch becomes active and performs all routing.

DETAILED DESCRIPTION OF THE INVENTION

Figure 1:
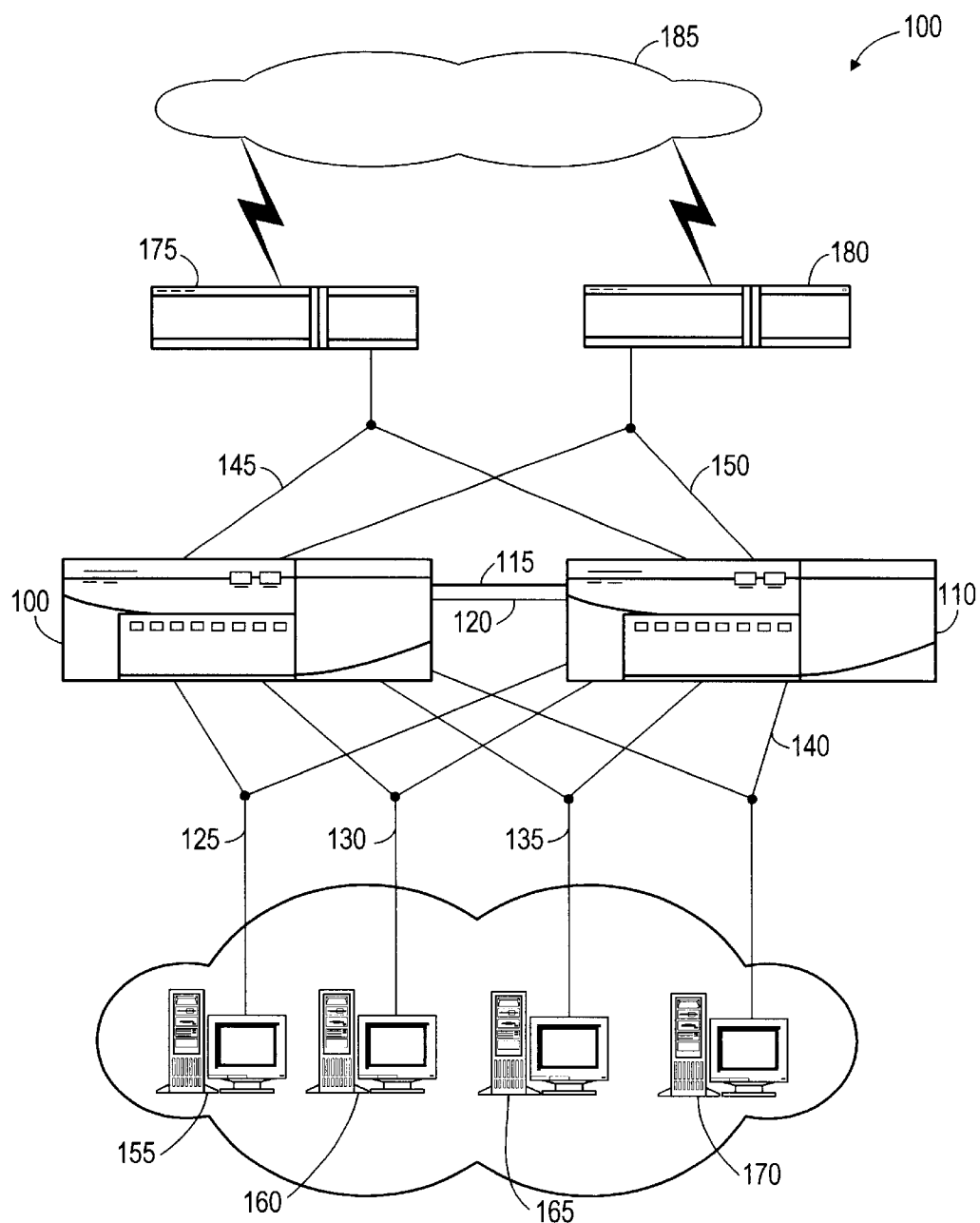
FIG. 1 is a block diagram of a network flow switching system in accordance with an embodiment of the present invention.

In a network flow switching system according to the present invention, the single point of failure of a network flow switch is eliminated by implementing an active-passive failure mode of operation. In the active-passive failover mode of the present invention, two network flow switches are configured. FIG. 1 illustrates the configuration of a network flow switching system 100. Network flow switches 105 and 110 are shown. In some embodiments, flow switches 105 and 110 are substantially identical, although other embodiments are possible in which flow switches 105 and 110 are not identical. Initially, network flow switch 105 is configured to the active status and flow switch 110 is configured to the passive status. Both flow switches have a plurality of Ethernet ports.

A failover link 115 connects flow switch 105 to flow switch 110. To remove any single point of failure, a backup failover link 120 also connects flow switch 105 to flow switch 110. In the present embodiment, failover link 115 connects an Ethernet port of flow switch 105 to an Ethernet port of flow switch 110, and backup failover link 120 connects a serial port of flow switch 105 to a serial port of flow switch 110. Backup failover link 115 connects the serial ports of the active and passive flow switches via a (crossover) serial cable. Control lines RTS (Receive Transmit Signal), CTS (Control Transmit Signal), DTR (Data Terminal Ready), and DCD (Data Carrier Detect) are used to convey the operational state of flow switches 105 and 110. A user can select any of the Ethernet ports and serial ports to be used for connecting flow switches 105 and 110 i.e., failover link 115 or backup failover link 120. Failover link 115 and backup failover link 120 do not carry any user traffic.

A first plurality of Y-cables 125–140 are connected to the flow switches 105 and 110. Each Y-cable 125–140 is connected to both flow switches 105 and 110. Each Y-cable is additionally connected to one of a plurality of servers 155–170. A second plurality of Y-cables 145 and 150 also attaches to the flow switches 105 and 110. Each Y-cable 145 and 150 is connected to both flow switches 105 and 110. Each Y-cable 145 and 150 is additionally connected to one of a plurality of routers 175 and 180. Routers 175 and 180 are, in turn, connected to a network 185 and deliver packets to and from the network 185.

It is recognized that any number of network components may be configured in one network system. For example, the embodiment illustrated in FIG. 1 shows two network flow switches 105 and 110, four servers 155–170, and two routers 175 and 180, but other embodiments are possible that comprise a different number of flow switches, servers, and routers.

Flow switch 110 (currently passive) constantly monitors the status of flow switch 105 (currently active). Flow switch 110 becomes active and begins delivering the packets when flow switch 110 detects a failure of flow switch 105. The minimum amount of time between a failure by flow switch 105 and activation of flow switch 110 is less than 10 seconds.

The use of Y-cables 125–150 enables flow switch 110 to begin routing packets between servers 155–170 and routers 175 and 180 without any physical changes in the networking system configuration. Thus, the use of Y-cables 125–150 ensures that there is a minimum disruption in network traffic.

A network flow switch suitable for use in the present invention is described in co-pending application Ser. No. 08/994,709, entitled "Cross-Platform Server Clustering Using A Network Flow Switch" by Sajit Bhaskaran, which is herein incorporated by reference in its entirety. Each of flow switches 105 and 110 is initialized using a same initialization sequence, as shown below.

Figure 2:
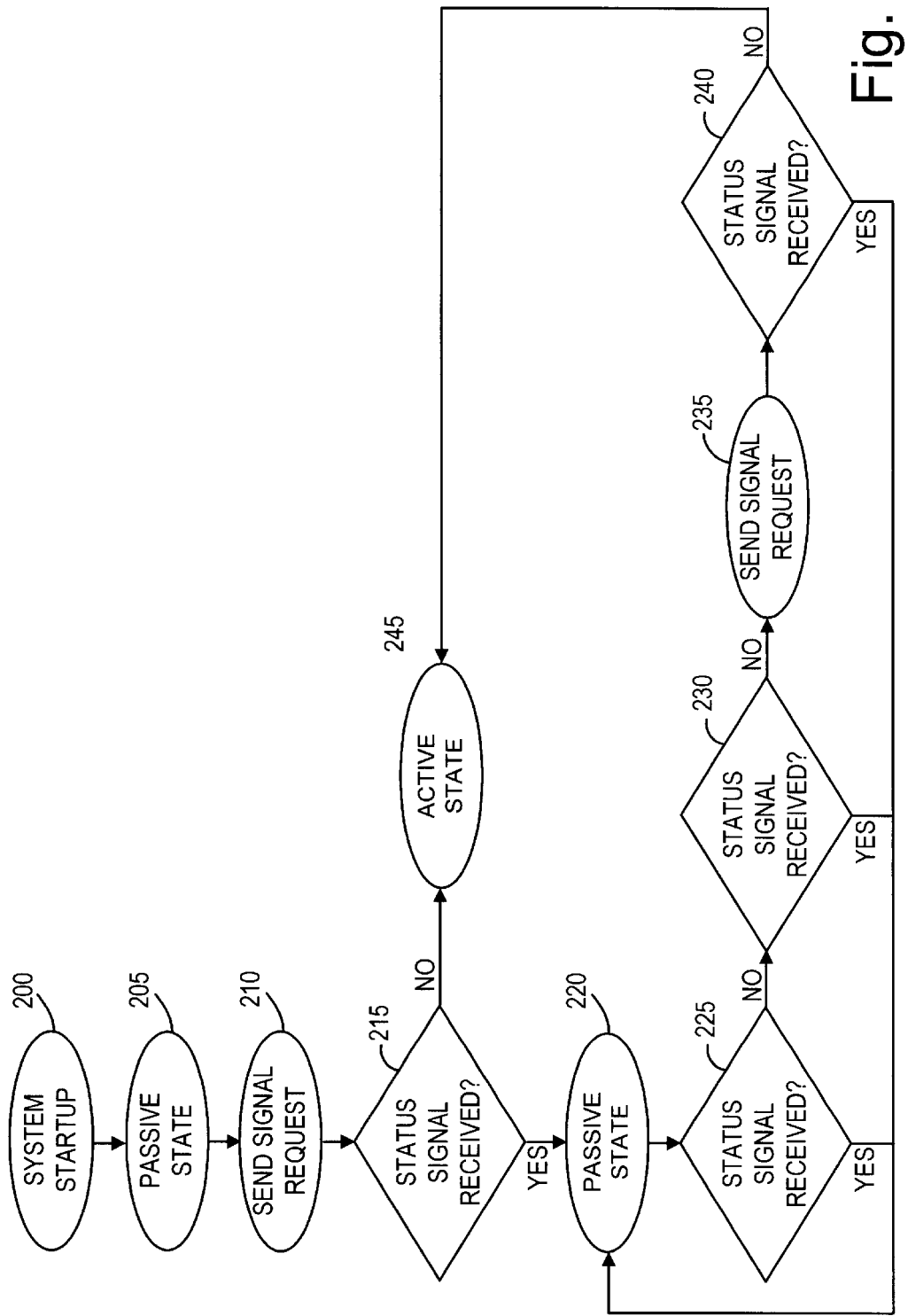
FIG. 2 is a flow diagram of a flow switch initialization procedure, in accordance to the one embodiment of the present invention.

FIG. 2 shows the initialization procedure used by flow switches 105 and 110. First in stage 200, a system startup procedure is connected. Startup of the flow switch 105 may take place prior to or concurrently with initialization of another flow switch or other networking equipment. In stage 205, flow switch 105 becomes passive. All of the Ethernet ports on the switch 105 except the one connected to failover link 115 are held in a disabled state, by holding the transceiver devices (called PHYs) that drive the Y-cables in a reset state.

In stage 210, flow switch 105 sends a status signal request to determine if another flow switch is already operating. In stage 215, flow switch 105 listens for a status signal for a predetermined period of time. If no status signal is received during the predetermined period of time, flow switch 105 becomes active and begins to process traffic. Alternatively, if a status signal is received during stage 215, indicating operation of another flow switch (e.g., flow switch 110), flow switch 105 becomes passive in stage 220. While in a passive state, flow switch 105 continues to hold all of its Ethernet ports in a disabled state (except failover link 115). The Ethernet ports are kept in a disabled state until passive flow switch 105 becomes active. In stage 220, flow switch 105 listens for a status signal. If a status signal is received during the predetermined period of time, flow switch 105 loops to step 220 and continues waiting for another status signal. If no status signal is received in stage 225, flow switch 105 waits for a status signal for a second predetermined period of time in stage 230. If a status signal is received during the predetermined period of time, flow switch loops back to stage 220 and continues waiting for another status signal. If no status signal is received in stage 225, flow switch 105 proceeds to stage 235 where it sends a status signal request. In stage 240 flow switch 105 listens for a status signal. If a status signal is received during the predetermined period of time, flow switch loops back to stage 220 and continues waiting for another status signal. If no status signal is received in stage 240, flow switch 105 advances to stage 245 where flow switch 105 becomes active.

Status signals and status signal requests are transmitted via failover link 115. If failover link 115 becomes non-operational, the status signals and the status signal requests are transmitted via backup failover link 120.

Due to the problems associated with relays described above, it is very beneficial to be able to use electrically passive components to connect both active flow switch 105 and passive switch 110 to the external network equipment, for example servers 155–170 and routers 175 and 180. Electrically passive elements are highly reliable, have a very high MTBF (Mean Time Between Failure), and do not require electrical power.

Figure 3:
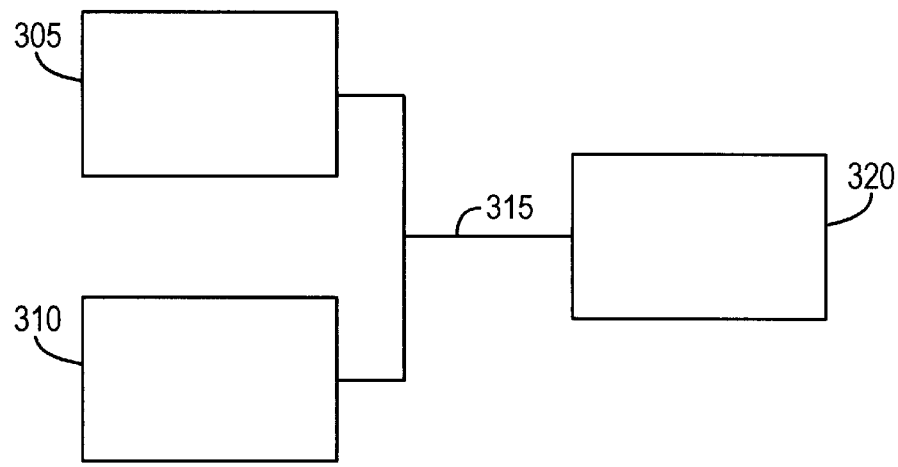
FIG. 3 is a block diagram of one of the Y-cables of FIG. 1.

In the present invention, as described above, servers 155–170 and routers 175 and 180 are substantially permanently fixtures of the network because they are switched between active flow switch 105 and passive (or spare) flow switch 110, when active flow switch 105 fails. This configuration is shown in FIG. 3. One of flow switches 305 and 310 is active and communicating with a permanently attached unit (server 304 in FIG. 3). Flow switches 305 and 310 do not communicate with each other over the Y-cable 315.

Figure 4:
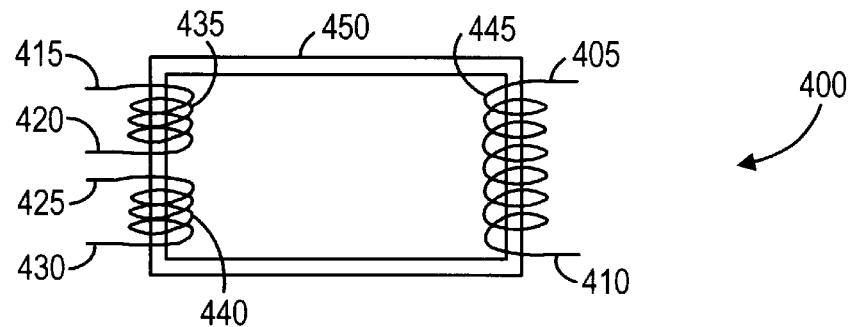
FIG. 4 illustrates a transmission portion of the Y-cable of FIG. 3.
Figure 5:
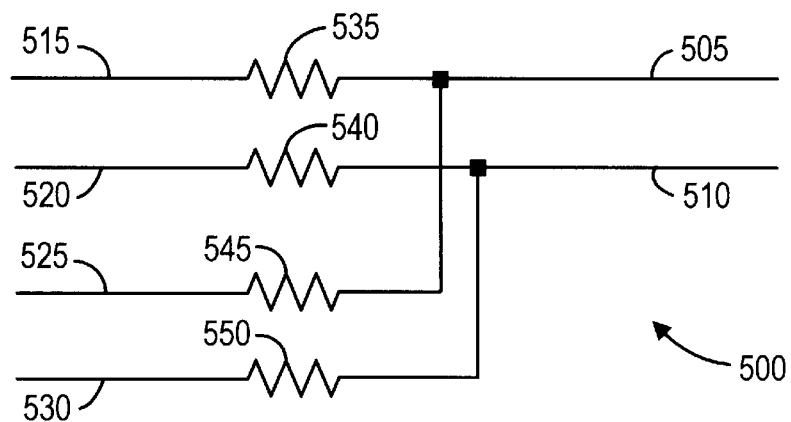
FIG. 5 illustrates a reception portion of the Y-cable of FIG. 3.

Since only one of flow switches 305 and 310 needs to be connected to server 320 at any given time, two circuits as shown in FIGS. 4 and 5 are used to match impedance as well as guarantee minimal interference from passive flow switch 310 or 305. The first circuit, shown in FIG. 4, is used for transmissions from active flow switch 305 or 310 to the permanently connected device, e.g. server 320. FIG. 5 illustrates a second circuit which is used for transmissions from the permanently connected device, e.g. server 320, to flow switch 305 or 310. Each Y-cable consists of four communication lines 405, 410, 505, 510 connected to the permanently attached device (e.g. server 320) via a 100 Base T cable. The four communication lines 405, 410, 505, 510 comprise two twisted pairs. Y-cable 315 thus consists of two twisted pairs connected to server 320 via the 100 Base T cable, one pair used by the server 320 for transmitting and one pair for receiving.

Each of communication lines 405, 410, 505, 510 is linked to two of communication lines 415–430 and 515–530 which are, in turn, connected to flow switches 305 or 310. Therefore, communication lines 405 and 410, used for receiving by server 320, are linked to communication lines 415 and 420 used for transmissions originating from flow switch 305. Communication lines 405 and 410 are also linked to communication lines 425 and 430 used for transmissions from second flow switch 310. Similarly, communication lines 505 and 510, used for transmissions from server 320, are linked to communication lines 515 and 520 used by flow switch 305 to receive inbound packets. Communication lines 505 and 510 are also linked to lines 525 and 530 used by flow switch 310 to receive inbound packets.

In a networking system, cable impedance must be carefully matched because signals transmitted throughout the network are of analog type and the levels of the signals are usually low, for example in the tens of millivolts range. Furthermore, 100 Base T signaling is designed primarily for point to point connections. Therefore, any mismatch in impedance results in gross reflections of signal transmissions, which may distort the original signal. The addition of an extra node on a cable for the purpose of redundancy of the networking equipment or failover can cause an imbalance in cable impedance. The circuits shown in FIGS. 4 and 5 enable a plurality of flow switches 305 and 310 to be connected to a single network component, for example server 320, without disturbing the balance in cable impedance.

A transformer 400 shown in FIG. 4 is used for transmission from flow switches 305 and 310 to server 320. Transformer 400 comprises a core 450, two primary coils 435 and 440, and a secondary coil 445. Transmission lines 415–430 of flow switches 305 and 310 connect to one of primary coils 435 and 440. Specifically, transmission lines 415 and 420 from flow switch 305 are connected to primary coil 435, and transmission lines 425 and 430 from flow switch 310 are connected to primary coil 440. The two lines of secondary coil 445 are connected to receiving lines 405 and 410 of the network device, (server 320 in this example). A turn ratio N:1 defines the number of turns of each primary coil 435 and 440 in relation to the number turns of secondary coil 445. When flow switch 305 is active and sending data, the passive transmit port of flow switch 310 acts as a load upon sending (or active) flow switch 305. The turns ratio N:1 can be adjusted so that active flow switch 305 sees only a certain impedance, for example 100 ohm, at transformer 400. When flow switch 310 is active and sending data, the passive transmit port of flow switch 305 acts as a load upon sending (or active) flow switch 310. If flow switches 305 and 310 are substantially identical, the former adjustment of the turns ratio N:1 will result in active flow switch 310 seeing the certain impedance, for example 100 ohm, at transformer 400.

For example, when flow switch 305 is active and transmitting to server 320, server 320 and (passive) flow switch 310 act as loads on transformer 400. The impedance seen by flow switch 305 at transmission lines 402 and 403 of transformer 400 is equal to the sum of the impedances of server 320 and flow switch 310 multiplied by the square of the ratio of the turns on coil 435 to the total turns on coils 440 and 445. Thus by adjusting the number of turns on coils 435–445, it is possible to make the impedance seen by flow switch 310 at transformer 400 equal to the impedance of server 320. The impedance of flow switch 305 is equal to the impedance of flow switch 310 if the flow switches are identical, as in this embodiment. Thus, the number of turns on coil 435 should equal the number of turns on coil 440 so that the impedance seen at transformer 400 when flow switch 305 is transmitting is equal to the impedance seen at transformer 400 when flow switch 310 is transmitting.

FIG. 5 illustrates a circuit 500 used by flow switches 305 or 310 to receive packets transmitted from server 320. Circuit 500 comprises four resistors 535–550 with certain individual electrical resistance values, for example 50 ohm. Each of receiving lines 515–530 of flow switches 305 and 310 are connected to one of resistors 535–550. That is, receiving line 515 is connected to resistor 535, receiving line 520 is connected to resistor 540, receiving line 525 is connected to resistor 545, and receiving line 530 is connected to resistor 550. The remaining terminals of resistors 535–550 are connected to transmission lines of server 320. That is, resistors 535 and 545 are connected to transmission line 505 of server 320. Resistors 540 and 550 are connected to transmission line 510 of server 320. When server 320 is transmitting to flow switch 305, resistors 535–550 act as balanced impedances of, for example, 50 ohm which nullify the drop in impedance where receiving lines 520 and 530 are connected to receiving lines 515 and 525, respectively. Circuits 400 and 500 yield a theoretical insertion loss of 3 db or 50 percent, but no signal distortion.

For example, if flow switches 305 and 310 have impedances of 100 ohm each, resistors 535–550 could have impedance values of 50 ohm each. When server 320 is transmitting, server 320 sees flow switches 305 and 310 in parallel, but each flow switch 305 and 310 in series with two of resistors 535–550. The resistors 535–550 may be identical if flow switches 305 and 310 are substantially identical. Thus the impedance seen by server 320 at lines 500 and 501 is equal to one half of the impedance of a series circuit comprising one of flow switches 305 or 310 and two of resistors 535–550. The impedance seen by server 320 at lines 500 and 501 is equal to the impedance of one flow switch 305 or 310 if the impedance of each of resistors 535–550 is half of the impedance of one flow switch 305 or 310. One half of the transmission power from server 320 is lost in resistors 535–550.

Another potential difficulty with the 100 Base T signaling mechanism is that if passive flow switch 310 is connected to the 100 Base T cable and passive flow switch 310 transmits IDLE symbols, the IDLE signals can interfere with signals from active flow switch 305. This problem is eliminated by holding the PHY (physical transceiver for the 100 Base T signals) of the passive flow switch 310 in RESET state until passive flow switch 310 becomes active.

Active flow switch 105 and the passive flow switch 110 communicate via failover link 115 to exchange information and status signals. Flow switches 105 and 110 utilize a protocol which comprises an Ethernet frame with an additional layer-3 header. The messages exchanged between flow switches 105 and 110 may be one of two types as described previously, a status signal (heartbeat) or a status signal request (heartbeat request). The status signal is sent by active flow switch 105 to indicate to passive flow switch 110 that active flow switch 105 is functioning correctly and that passive flow switch 110 should therefore remain in a passive state. The status signal request is sent by passive flow switch 110 to active flow switch 105 to request that active flow switch 105 respond immediately by sending a status signal. Passive flow switch 110 sends the status signal request after two consecutive status signals were deemed to have not been received, that is two predetermined periods of time have elapsed since passive flow switch 110 has received a status signal. A status signal request is also sent as part of the flow switch initialization sequence illustrated in FIG. 2.

Figure 6:
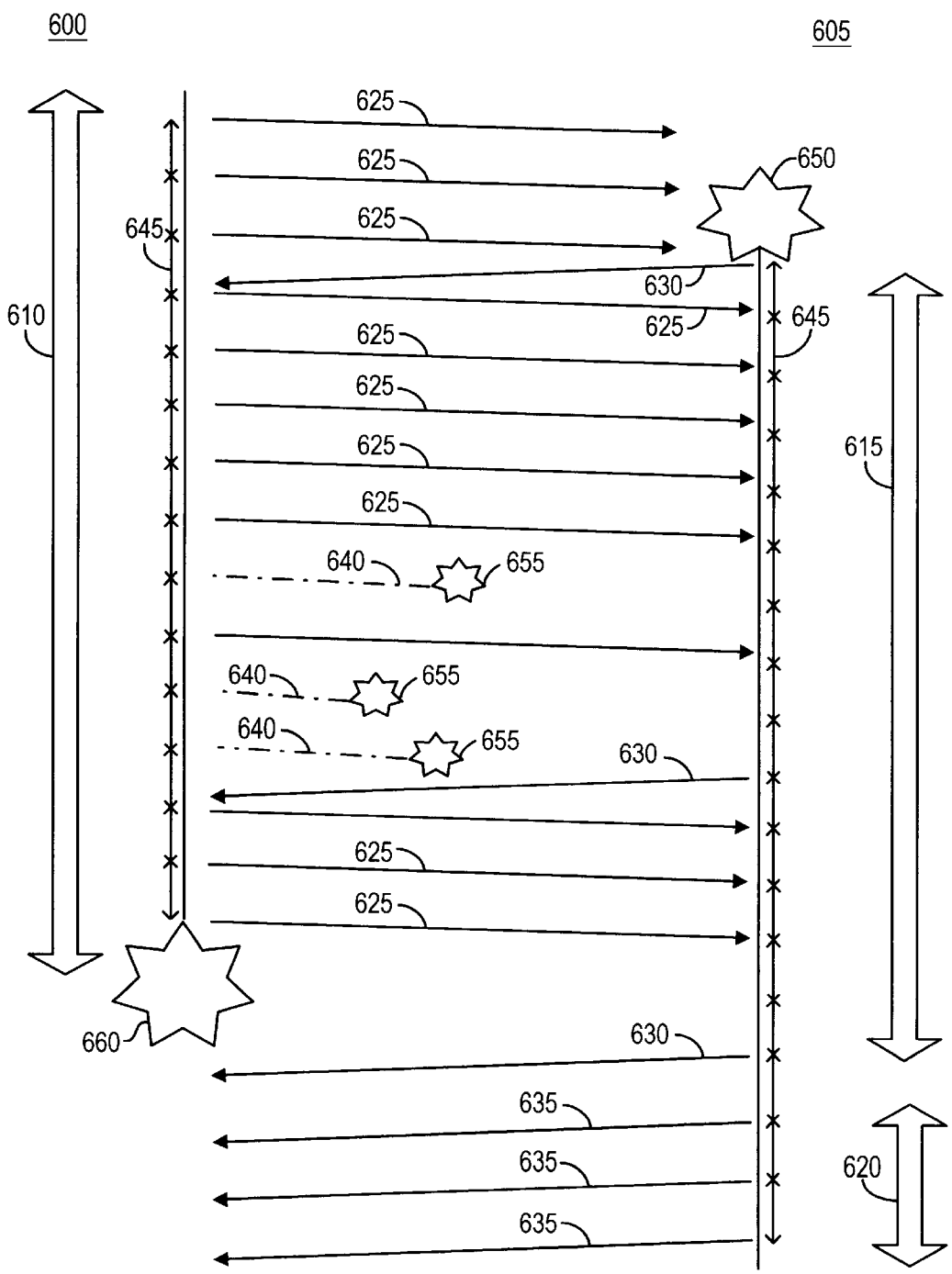
FIG. 6 is a diagram illustrating a failure protocol sequence, in accordance to an embodiment of the present invention.

FIG. 6 illustrates an example of a series of signal exchanges between flow switches 600 and 605. Flow switch 600 is represented on the left side of the figure, and flow switch 605 is represented on the right side of the figure. A status bar 610 indicates the status of flow switch 600 and status bars 615 and 620 indicate the status of flow switch 605. Arrows 625–640 indicate discrete communications comprising status signals or status signal requests from one of the two flow switches 600 and 605. Therefore, arrows 625 and 640 that point to the right indicate messages transmitted by flow switch 600, and arrows 630 and 635 that point to the left indicate messages transmitted by flow switch 605. The chronology of the sequence progresses from top to bottom. Therefore the topmost arrow 625 represents the first transmission in the example and the bottom most arrow 635 represents the last transmission in the example. Evenly spaced marks 645 indicate predetermined time intervals.

At the earliest time shown on FIG. 6, status bar 610 indicates that flow switch 600 is in active state. Three arrows 625 indicate three status signals transmitted from the active flow switch 600. No passive flow switch receives these transmissions. Polygon 650 indicates initialization of flow switch 605. Upon being initialized, flow switch 605 configures itself to the passive state and transmits a status signal request 630. Status signal request 630 is received by flow switch 600, and flow switch 600 immediately transmits a status signal 625. Flow switch 605 receives status signal 625. Flow switch 600 continues to transmit status signals 625 at periodic intervals. Polygons 655 indicate that status signals 640 are lost and not received by flow switch 605. The loss of a single status signal 640 does not interrupt the operation of flow switches 600 and 605. Flow switch 605 maintains its passive status and waits to receive a status signal 625. However, when two consecutive status signals 640 are lost and not received by flow switch 605, flow switch 605 transmits a status signal request 630. Flow switch 600 receives the status signal request 630 and immediately returns a status signal 625 to flow switch 605. Polygon 660 indicates a failure of active flow switch 600. Failure of flow switch 605 comprises an electrical, hardware, or software problem and causes flow switch 600 to stop transmitting status signals 625. After two consecutive periods, indicated by marks 645, during which flow switch 605 does not receive a status signal 625, flow switch 605 transmits a status signal request 630. During the next time interval, flow switch 605 does not receive a status signal 625. At this time, flow switch 605 becomes active, enabling all Ethernet ports of flow switch 605. Status bar 620 indicates the active status of flow switch 605. During active operation, flow switch 605 transmits status signals 635.

Figure 7A:
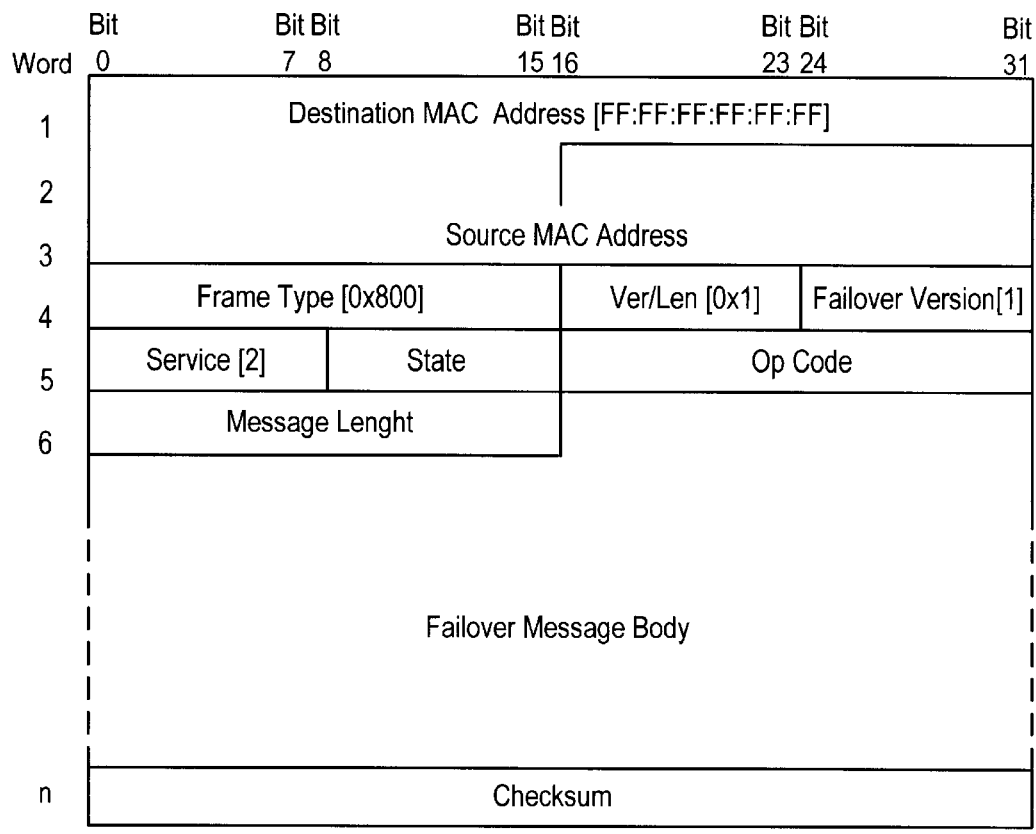
FIG. 7A is a block diagram of a failover message, in accordance to an embodiment of the present invention.

FIG. 7A shows the format of failover message transmitted between flow switches 105 and 110 via failover link 115 or backup failover link 120. Fixed values are shown in the form of '[xx].'

A Source MAC Address field holds the system (failover) MAC address of flow switch 105 or 110.

A Service field value indicates that the message is from a flow switch 105 or 110 operating in active-passive mode (using Y-cables).

A State field indicates the current operational state (passive=1, active=2) of flow switch 105 or 110.

An Op Code field indicates the type of failover message (status signal=1; status signal request=2).

A Message Length field indicates the length (in bytes) of the body of the failover message.

Figure 7B:
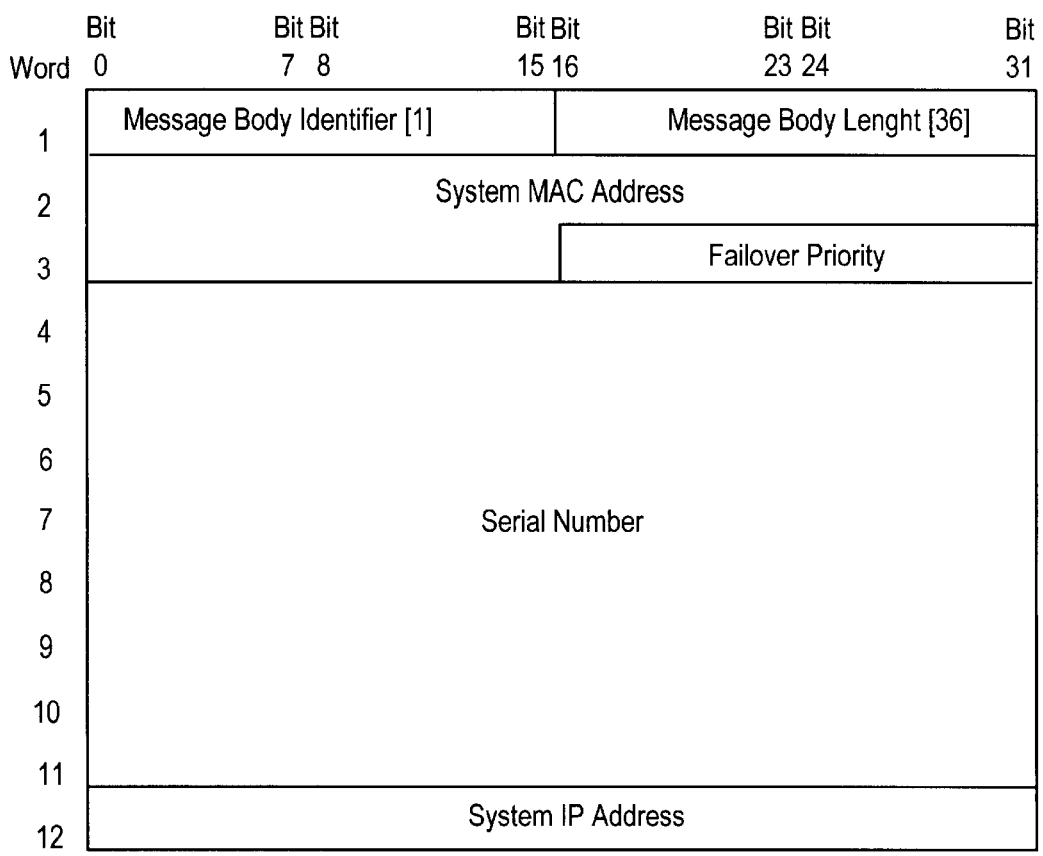
FIG. 7B is a block diagram of a failure message, in accordance to an embodiment of the present invention.

FIG. 7B shows the format for a failover message body that is used for both status signals and status signal requests. Fixed values are shown in the form of '[xx].'

A System MAC Address field holds a system (failover) MAC address of flow switch 100 or 101.

A Failover Priority indicates a user configured value for a flow switch failover priority (high=1, low=2).

A Serial Number is a factory assigned serial number of flow switch 100 or 101.

A System IP Address is a user assigned flow switch system IP address.

Figure 8:
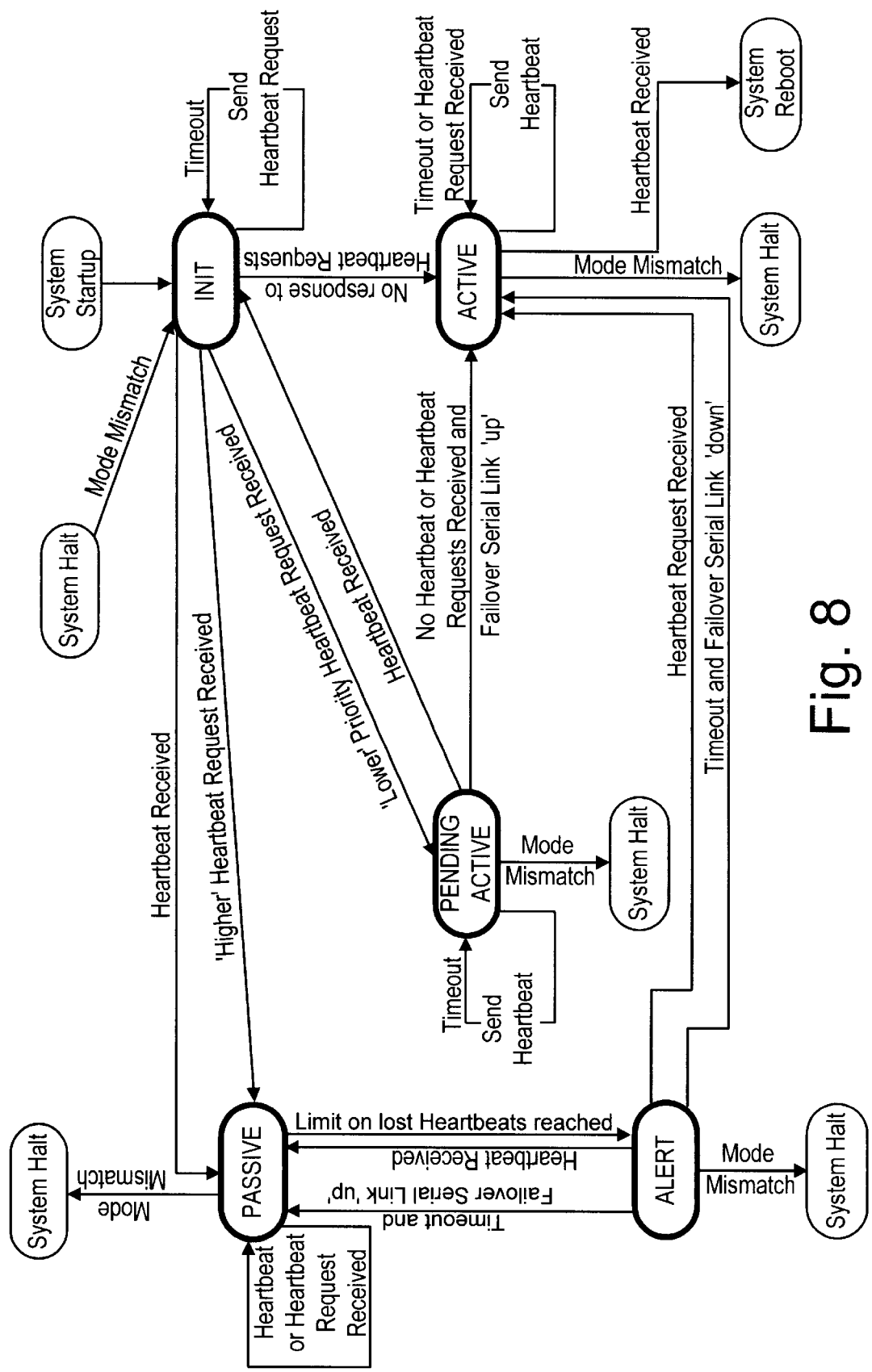
FIG. 8 shows a flow diagram of a flow switch failover operation, in accordance to an embodiment of the present invention.

Flow switches 105 and 110 provide the function of a state machine to perform the processing necessary to provide failover functionality. FIG. 8 shows an overview of a flow switch failover state machine process. An active and passive flow switches 105 and 110 run the same software and therefore the same active-passive state machine. Flow switches 105 and 110 differ only in their configuration.

FIG. 8 shows five possible configuration states for flow switches 105 and 110. Upon startup, flow switch 105 or 110 enters an initialization state labeled INIT in FIG. 9. This state is also reached after a system halt. In the initialization state, flow switch 105 transmits a status signal request. A timer time-out occurs after a predetermined period of time. If flow switch 105 does not receive a status signal response before timing out, flow switch 105 enters an active state. If the flow switch 105 receives a status signal before timing out, flow switch 105 enters a passive state. Flow switch 105 will also enter the passive state if it receives a status signal request of a higher priority than the status signal request that flow switch 105 had transmitted. If flow switch 105 receives a status signal request of a lower priority than the status signal request that flow switch 105 had transmitted, then flow switch 105 enters the pending active state.

In the pending active state, flow switch 105 transmits status signals at predetermined periods of time. If neither a status signal nor a status signal request is received and the backup failover link 120 is operational, flow switch 105 enters the active state. If a status signal is received, flow switch 105 reverts to the initialization state. Finally, if a mode mismatch occurs while flow switch 105 is in the pending active state, flow switch 105 performs a system halt.

If flow switch 105 is in the passive state, flow switch 105 continues to monitor for status signals and status signal requests via failover link 115. If the limit on lost status signal requests is reached, two in this embodiment, flow switch 105 enters the alert state. If a mode mismatch occurs while flow switch 105 is in the passive state, flow switch 105 performs a system halt.

If flow switch 105 is in the alert state, it continues to monitor for status signals and status signal requests. If a time-out occurs and backup failover link 120 is in operation, flow switch 105 enters the passive state. Flow switch 105 also enters the passive state if a status signal is received. If a status signal request is received while flow switch 105 is in the alert state, flow switch 105 enters the active state. If flow switch 105 is in the alert state and a time-out occurs while backup failover link 120 is not in operation, flow switch 105 enters the active state. If a mode mismatch occurs while flow switch 105 is in the alert state, the switch 105 performs a system halt.

If flow switch 105 is in the active state, flow switch 105 performs packet switching. Flow switch 105 continues to monitor status signals and status signal requests. If a time-out occurs or a status signal request is received, flow switch 105 transmits a status signal. If flow switch 105 receives a status signal while flow switch 105 is in the active state, flow switch 105 performs a system reboot. If a mode mismatch occurs while flow switch 105 is in the active state, flow switch 105 performs a system halt.

Table 1 describes the states of the flow switch failover state machine of FIG. 8.

TABLE 1

| States | State Description |
| --- | --- |
| INIT | Initial state after system is started up |
| ACTIVE | Local flow switch is in an active role (i.e. interfaces enabled and processing traffic) and sending periodic status signals to a peer flow switch. |
| PASSIVE | Local flow switch is in a passive role (i.e. interfaces disabled and not processing traffic) and monitoring the status signals from a peer flow switch. |
| PENDING ACTIVE | Local flow switch is about to go to an ACTIVE state (from INIT state) provided no response is received from a peer flow switch. |
| ALERT | Local flow switch is about to go to an ACTIVE state (from a PASSIVE state) provided no response is received from a peer flow switch. |

Table 2 describes the events handled by the failover state machine of FIG. 8.

TABLE 2

| Events | Event Description |
|---|---|
| HEARTBEAT RECEIVED | Status signal received from peer flow switch. |
| HEARTBEAT REQUEST RECEIVED | Status signal request received from peer flow switch. |
| MODE MISMATCH | Message (status signal or status signal request) received from a peer flow switch but failover mode is different. |
| TIME-OUT | Timer time-out. |

Table 3 shows the internal state machine used by the present invention to perform the failover processing:

TABLE 3

| State | Event | | | |
|---|---|---|---|---|
| | Heartbeat Received | Heartbeat Request Received | Mode Mismatch | Time-out |
| INIT | restart timer if state not ACTIVE halt system else go PASSIVE endif | restart timer if state is ACTIVE else if (lower priority) go PASSIVE else go PENDING ACTIVE endif endif | halt system | start timer if sent enough Heartbeat Requests if Failover Serial link up go PASSIVE else go ACTIVE else send another Heartbeat Request endif |
| ACTIVE | reboot system | restart timer send Heartbeat | halt system | start timer send Heartbeat |
| PASSIVE | restart timer | restart timer | halt system | start timer if limit on Heartbeats reached send Heartbeat Request go ALERT endif |
| PENDING ACTIVE | restart timer go INIT | restart timer go ACTIVE | halt system | start timer if sent enough Heartbeats if Failover Serial link up go INIT else go ACTIVE else send another Heartbeat endif |
| ALERT | restart timer go PASSIVE | restart timer go ACTIVE | halt system | start timer if Failover Serial link up send Heartbeat go ACTIVE else go PASSIVE endif |

Embodiments described above illustrate, but do not limit the invention. In particular, the invention is not limited to a network flow switching system housing two network flow switches. In fact, those skilled in the art realize that the principles of the invention can be applied to an arbitrary number of network flow switches. Further, the invention is not limited to any specific hardware implementation. In fact, circuits other than those described herein may be used in accordance to the principles of the invention.

We claim:

1. A network flow switching system for routing packets between a plurality of servers and a plurality of network devices, the system comprising:
   a plurality of Y-cables, each of the Y-cables being connected to either one of the servers or one of the network devices;
   a first flow switch connected to the plurality of Y-cables; and
   a second flow switch connected to the plurality of Y-cables and to the first switch;
       wherein packets are routed between the servers and the network devices via the first flow switch if the first flow switch is active and the packets are routed between the servers and the network devices via the second flow switch if the first flow switch is passive.

2. The system of claim 1, wherein the second flow switch is identical to the first flow switch.

3. The system of claim 1, wherein the Y-cables comprise only electrically passive elements.

4. The system of claim 3, wherein an impedance at one end of the Y-cables matches an impedance at an opposite end of the Y-cables in each transmission direction, when only one of the first and the second flow switches is active.

5. The system of claim 1, wherein when the second flow switch is passive, a transceiver unit of the second flow switch is held in RESET state.

6. The system of claim 1, wherein the first flow switch periodically transmits status signals to the second flow switch, the status signals being indicative of an operational status of the first flow switch.

7. The system of claim 6, wherein the second flow switch transmits a request signal to the first switch if a status signal is not received from the first flow switch within a predetermined period of time.

8. The system of claim 7, wherein the second flow switch becomes active if a status signal is not received from the first flow switch within a predetermined period of time after transmission of the request signal.

9. The system of claim 1, wherein the first flow switch and the second flow switch are initialized.

10. The system of claim 9, wherein the initialization of the first flow switch comprises:
    sending a request signal;
    configuring the first flow switch to the active status if the first flow switch does not receive a status signal within a predetermined period of time;
    configuring the first flow switch to the passive status if the first flow switch receives a status signal within a predetermined period of time;
    configuring the first flow switch to the passive status if the first flow switch receives a high priority request signal within a predetermined period of time; and
    configuring the first flow switch to a pending active status if the first flow switch receives a low priority status signal within a predetermined period of time.

11. The system of claim 9, wherein the initialization of the second flow switch comprises:
    sending a request signal;
    configuring the second flow switch to the active status if the second flow switch does not receive a status signal within a predetermined period of time;
    configuring the second flow switch to the passive status if the second flow switch receives a status signal within a predetermined period of time;

configuring the second flow switch to the passive status if the second flow switch receives a high priority request signal within a predetermined period of time; and configuring the second flow switch to a pending active status if the second flow switch receives a low priority status signal within a predetermined period of time.

12. The system of claim 1, wherein the plurality of network devices comprises one or more routers.

13. The system of claim 1, wherein the plurality of network devices comprises one or more switches.

14. A method for routing packets between a plurality of servers and a plurality of network devices, the method comprising:

routing the packets between the servers and the network devices via a plurality of Y-cables, each of the Y-cables connecting either one of the servers or one of the network devices to the first flow switch and the second flow switch;

routing packets between the servers and the network devices via a first flow switch if the first flow switch is active; and routing the packets between the servers and the network devices via the second flow switch if the first flow switch is passive.

15. The method of claim 14, wherein when the second flow switch is passive, a transceiver unit of the second flow switch is held in RESET state.

16. The method of claim 14, wherein the first flow switch periodically transmits status signals to the second flow switch, the status signals being indicative of an operational status of the first flow switch.

17. The method of claim 14, wherein the second flow switch transmits a request signal to the first switch if a status signal is not received from the first flow switch within a predetermined period of time.

18. The method of claim 14, wherein the second flow switch becomes active if a status signal is not received from the first flow switch within a predetermined period of time after transmission of the request signal.

19. The method of claim 14, wherein the first flow switch and the second flow switch are initialized.

20. The method of claim 19, wherein the initialization of the first flow switch comprises:

sending a request signal;

configuring the first flow switch to the active status if the first flow switch does not receive a status signal within a predetermined period of time;

configuring the first flow switch to the passive status if the first flow switch receives a status signal within a predetermined period of time;

configuring the first flow switch to the passive status if the first flow switch receives a high priority request signal within a predetermined period of time; and configuring the first flow switch to a pending active status if the first flow switch receives a low priority status signal within a predetermined period of time.

21. The method of claim 19, wherein the initialization of the second flow switch comprises:

sending a request signal;

configuring the second flow switch to the active status if the second flow switch does not receive a status signal within a predetermined period of time;

configuring the second flow switch to the passive status if the second flow switch receives a status signal within a predetermined period of time;

configuring the second flow switch to the passive status if the second flow switch receives a high priority request signal within a predetermined period of time; and configuring the second flow switch to a pending active status if the second flow switch receives a low priority status signal within a predetermined period of time.

22. The method of claim 14, wherein the plurality of network devices comprises one or more routers.

23. The method of claim 14, wherein the plurality of network devices comprises one or more switches.

24. A computer readable storage medium comprising computer instructions for:

routing packets between a plurality of servers and a plurality of network devices via a plurality of Y-cables, each of the Y-cables connecting either one of the servers or one of the network devices to the first flow switch and the second flow switch;

wherein the first flow switch routes packets between the servers and the network devices if the first flow switch is active and the second flow switch routes the packets between the servers and the network devices if the first flow switch is passive.

25. The computer readable storage medium of claim 24, wherein when the second flow switch is passive a transceiver unit of the second flow switch is held in RESET state.

26. The computer readable storage medium of claim 24, wherein the first flow switch periodically transmits status signals to the second flow switch, the status signals being indicative of an operational status of the first flow switch.

27. The computer readable storage medium of claim 24, wherein the second flow switch transmits a request signal to the first switch if a status signal is not received from the first flow switch within a predetermined period of time.

28. The computer readable storage medium of claim 24, wherein the second flow switch becomes active if the second flow switch does not receive a status signal from the first flow switch within a predetermined period of time after the second flow switch transmits the request signal.

29. The computer readable storage medium of claim 24, further comprising computer instructions for:

initializing the first flow switch and the second flow switch.

30. The computer readable storage medium of claim 29, wherein the first flow switch and the second flow switch initialize by:

sending a request signal;

configuring the first flow switch to the active status if the first flow switch does not receive a status signal within a predetermined period of time;

configuring the first flow switch to the passive status if the first flow switch receives a status signal within a predetermined period of time;

configuring the first flow switch to the passive status if the first flow switch receives a high priority request signal within a predetermined period of time; and configuring the first flow switch to a pending active status if the first flow switch receives a low priority status signal within a predetermined period of time.

31. The computer readable storage medium of claim 24, wherein the plurality of network devices comprises one or more routers.

32. The computer readable storage medium of claim 24, wherein the plurality of network devices comprises one or more switches.

* * * * *